June 20, 1961   C. L. ANDERSON   2,988,828
LIVESTOCK BOOT
Filed March 1, 1960
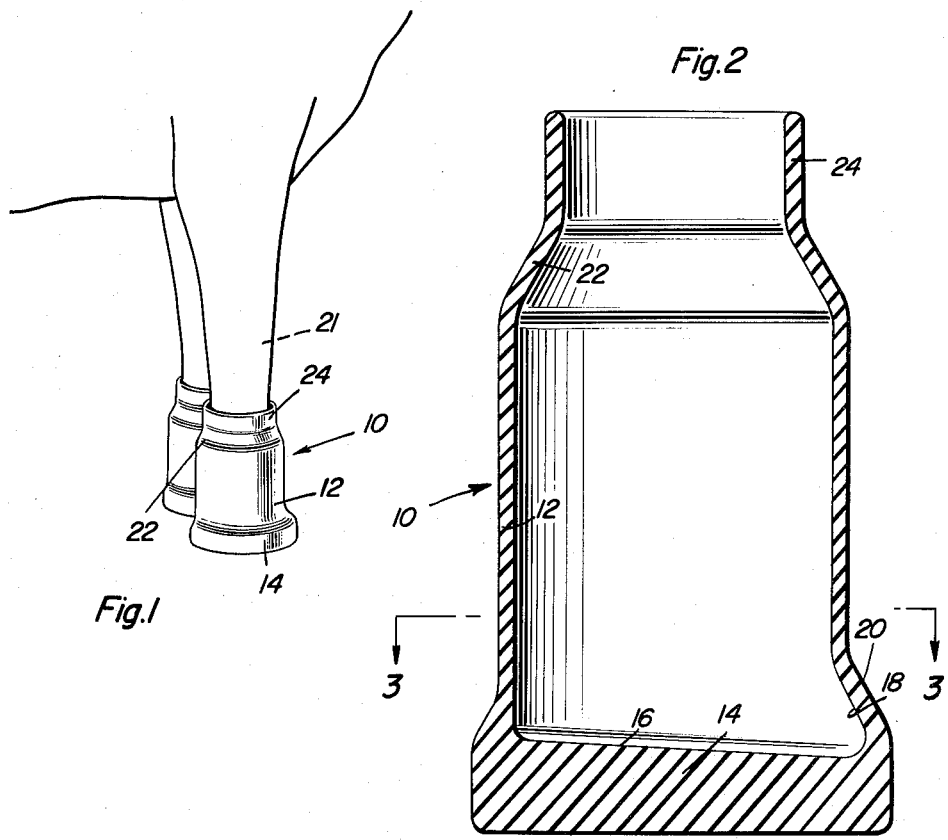
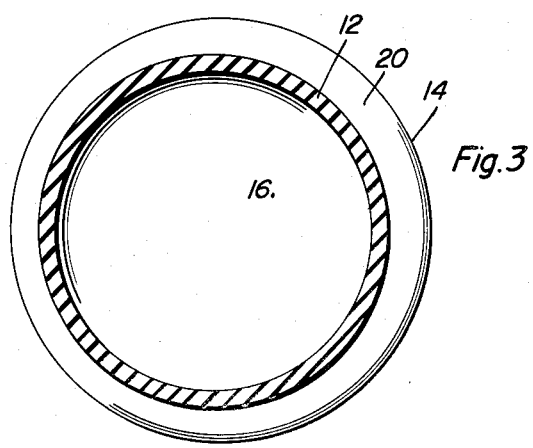
Carl L. Anderson
INVENTOR.

2,988,828
LIVESTOCK BOOT
Carl L. Anderson, Crete Hotel, Crete, Nebr.
Filed Mar. 1, 1960, Ser. No. 12,184
3 Claims. (Cl. 36—2.5)

The present invention generally relates to a protective covering in the form of a boot for the feet of solid-hoofed animals such as livestock and especially cows, bulls, calves and steers.

The primary object of the present invention is to provide a boot for livestock that may be constructed of rubber tubing material or of tubular plastic material or of any other suitable material of a waterproof nature which will prevent the feet from becoming wet.

It is well known that barnyard areas quite often are wet and muddy and animals such as livestock quite often stand or walk in this mud and water. It has been found that a good many diseases and other ill effects occur due to the animal's feet being wet for an extended period of time. For example, foot rot is known to spread in damp areas of this nature. Also, sicknesses such as pneumonia, red nose, the common cold and coccidiosis are also liable to be caused by the animals getting wet feet. Therefore, it is a primary object of the present invention to provide a livestock boot which will prevent the animal from having wet feet which will enable the animal to produce a greater quantity and better quality milk having a higher butterfat content and will also enable the cow to have a healthier calf and further provide for a longer life expectancy for the animal.

A further object of the present invention is to provide a livestock boot which is simple in construction, easy to use, relatively inexpensive and otherwise well adapted for its intended purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating a pair of the livestock boots of the present invention installed in position;

FIGURE 2 is a longitudinal, vertical sectional view of one of the boots illustrating the structure thereof; and FIGURE 3 is a transverse, sectional view taken substantially upon a plane passing along section line 3—3 of FIGURE 2 illustrating further structural details of the boot.

Referring now specifically to the drawings, the numeral 10 generally designates the livestock boot of the present invention which includes an elongated tubular cylindrical member 12 which may be constructed of tubular rubber material, tubular plastic material or any other suitable material having long wearing qualities and waterproof qualities. The bottom of the tubular member 12 is closed by an enlarged, circular, thickened bottom member or cushion sole 14 which has the upper surface 16 thereof inclined downwardly and toward the front of the livestock boot. The forward edge of the bottom 14 is provided with a recess 18 defined by an outwardly flared portion 20 at the bottom of the tubular member 12 where it connects with the bottom 14 for receiving the toe portion of the hoof on the animal's leg 21 thereby substantially conforming the boot to the hoof and adjacent foot structure.

The relatively thick bottom portion 14 will provide adequate support for the hoof of the animal and will provide a long lasting quality to the device since the bottom will receive more stresses and strains than any other part of the boot.

The upper end of the tubular member 12 is provided with an inwardly inclined or converging wall portion 22 and an upwardly extending cylindrical neck portion 24 of lesser diameter than the tubular member 12 whereby the inclined portion 22 forms a transition from the larger diameter of the tubular member 12 and the smaller diameter of the tubular or cylindrical neck 24. The reduction in diameter of the tubular neck 24 will provide for retention of the stock boot on the foot and leg portion of the animal inasmuch as the tubular neck 24 will grippingly engage the leg 21 of the animal under tension. This gripping engagement will retain the boot in position during normal use of the legs of the animal and the entire device is preferably constructed of one piece of material and the sizes and connections of the boot may be altered as required to conform to different shapes and sizes of animal feet. The boot may be slipped on the animal's leg very easily and will be retained thereon for keeping the animal's feet in a dry condition thereby preventing sicknesses and illnesses as set forth in the objects of the invention.

The prevention of foot rot that is accomplished by the present invention is quite a problem to dairymen and is quite costly.

In a recent report, foot rot was listed as fourth of the 48 most prevalent animal diseases in a major livestock State.

The disease appears to be more prevalent during a wet season. This is understandable since damp or wet ground more readily fosters spread of the infection. But it can be picked up on dry ground also.

Foot rot is most active in late winter and early spring. The disease, however, occurs almost any time of the year, particularly if cattle pass through infected damp or muddy pastures or feed lots. Muddy yards serve as excellent breeding places for the organisms.

Many kinds of germs are present in soil and water. Often it takes only a tiny break or cut in the skin or soft parts of the foot for easy access to underlying tissue. When conditions are right, inflammation of the foot develops.

Pus-forming bacteria, such as colon bacilli, spirochetes, as well as other microorganisms, frequently gain entrance through injured or susceptible tissue. A germ which destroys the tissue it affects and often is considered the chief troublemaker in foot rot is known as *Bacillus necrophorus*.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An imperforate, waterproof boot for solid-hoofed livestock animals comprising a tubular member of circular horizontal cross-section and of resilient material and for receiving the lower portion of an animal's leg in spaced, substantially concentric relation thereto, and an enlarged, circular bottom member forming a closure for the lower end of the tubular member, said bottom member being constructed of resilient material and having a thickness considerably greater than the thickness of the tubular member for receiving the hoof of the animal, said tubular member including a tubular neck at the upper end thereof of reduced diameter for encircling and gripping the leg under tension for retaining the boot in position thereon by friction.

2. The structure as defined in claim 1 wherein said boot is of one piece construction with the upper surface of the closed lower end of the boot formed by the bottom being inclined for engaging the hoof of an animal.

3. The structure as defined in claim 2 wherein the forward lower corner of the boot is provided with an inclined recess for receiving the toe portion of an animal's hoof.

References Cited in the file of this patent

UNITED STATES PATENTS

| | | |
|---|---|---|
| 2,197,537 | Cheeley | Apr. 16, 1940 |
| 2,424,172 | Huddleston | July 15, 1947 |
| 2,446,371 | Jones | Aug. 3, 1948 |
| 2,535,394 | Davis | Dec. 26, 1950 |
| 2,651,853 | Lewis | Sept. 15, 1953 |